No. 612,286. Patented Oct. 11, 1898.
G. A. TUCKFIELD.
TRUNK FASTENING.
(Application filed July 12, 1898.)
(No Model.)

WITNESSES:
Joshua Bergham
Isaac B. Owy

INVENTOR
G. A. Tuckfield
BY
Munn
ATTORNEYS.

UNITED STATES PATENT OFFICE.

GEORGE A. TUCKFIELD, OF SALT LAKE CITY, UTAH.

TRUNK-FASTENING.

SPECIFICATION forming part of Letters Patent No. 612,286, dated October 11, 1898.

Application filed July 12, 1898. Serial No. 685,797. (No model.)

*To all whom it may concern:*

Be it known that I, GEORGE A. TUCKFIELD, of Salt Lake City, in the county of Salt Lake and State of Utah, have invented a new and Improved Trunk-Fastening, of which the following is a full, clear, and exact description.

This invention is a trunk-fastening of that class in which chains or ropes are provided and adapted to encircle the trunk, so that by means of a tension device the chain or rope may be properly strained.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1:
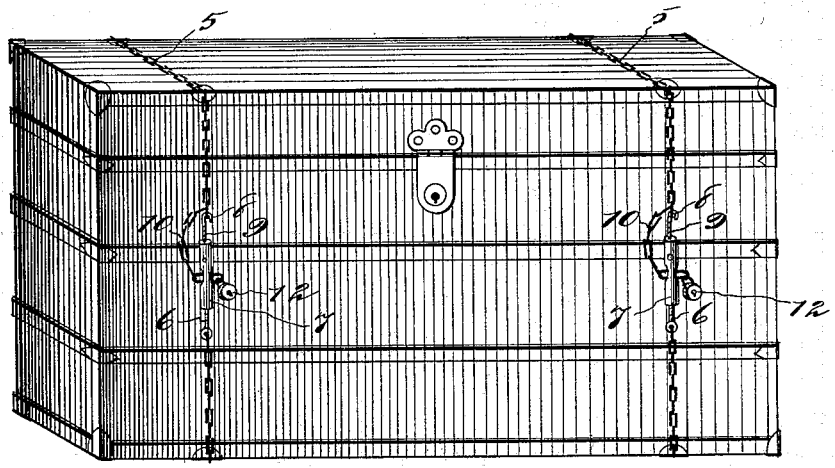
Figure 2:
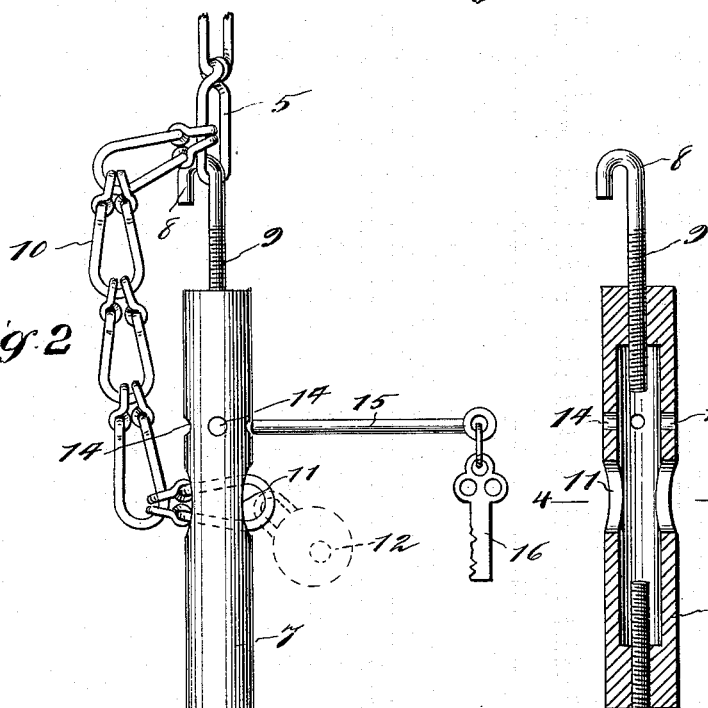
Figure 3:
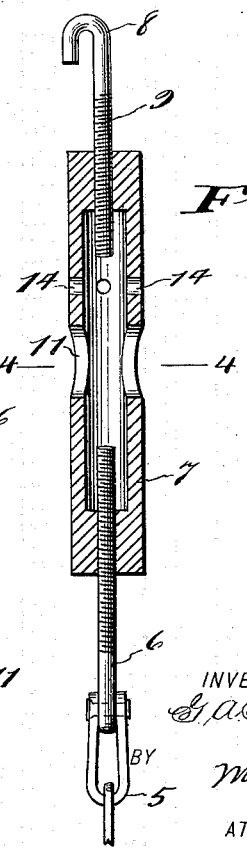
Figure 4:

Figure 1 is a perspective view of a trunk having my improvement applied thereto. Fig. 2 is an enlarged elevation of the tension device. Fig. 3 is a longitudinal section thereof, and Fig. 4 is a detail section on the line 4 4 of Fig. 3.

It is preferred to apply one or more of the fastening devices to a trunk, two being shown in Fig. 1, these fastening devices being duplicates of each other. Each fastening device has a main chain 5, one end of which is permanently fastened to a threaded rod 6, working in one end of a cylindrical turnbuckle 7, and the other end of the chain is adapted to be removably connected with the hook 8 of a threaded rod 9, working in the opposite end of the turnbuckle 7. By manipulating the turnbuckle the tension of the chain may be regulated and the trunk be secured.

Secured to one end of the main portion of the chain 5 is a branch chain 10, the free end link of which is capable of passing through an opening 11 in the turnbuckle at approximately the middle thereof. This free end link when projected into the opening 11, as shown in Figs. 1 and 2, is held by a lock 12. The turnbuckle 7 is provided with openings 14, in which may be inserted a pin 15 for revolving the turnbuckle. This pin 15 is connected with the key 16 of the lock 12. By reason of this construction the parts of the chain may be connected with the turnbuckle and the turnbuckle revolved to properly strain the chain. Then the end link of the branch 10 of the chain may be inserted into the opening 11 of the turnbuckle and fastened by the lock 12. This will prevent the turning of the turnbuckle and the consequent relaxation of the strain on the chain.

Having thus described my invention, I claim as new and desire to secure by Letters Patent—

1. A trunk-fastening comprising a main chain, a turnbuckle having a connection therewith, a branch chain attached to the main chain and capable of connection with the turnbuckle, and a lock for holding the branch chain in said connection.

2. A trunk-fastening having a main chain, a turnbuckle in connection therewith, and a branch chain attached to the main chain and adapted to have connection with the turnbuckle to lock the same.

3. A trunk-fastening having a main chain, a threaded rod attached to one end thereof, a turnbuckle wherein said threaded rod works, a second threaded rod also working in the turnbuckle and having a hook for removable connection with the main chain, a branch chain attached to the main chain and capable of engaging the turnbuckle, and a lock serving to hold the branch chain engaged with the turnbuckle.

4. A trunk-fastening having a main chain, a cylindrical turnbuckle in connection therewith and having a passage therein, a branch chain attached to the main chain and having a link capable of projecting into the passage in the turnbuckle, and a lock serving to hold said link in the passage.

GEORGE A. TUCKFIELD.

Witnesses:
EUGENE M. CANNON,
JOHN M. CANNON.